(12) United States Patent
Zozgornik et al.

(10) Patent No.: US 10,551,019 B2
(45) Date of Patent: Feb. 4, 2020

(54) ILLUMINATION DEVICE FOR A VEHICLE HEADLIGHT

(71) Applicant: Lumileds Holding B.V., Schiphol (NL)

(72) Inventors: Steffen Zozgornik, Aachen (DE); Roman Hohn, Aachen (DE)

(73) Assignee: Lumileds Holding B.V., Schiphol (NL)

( * ) Notice: Subject to any disclaimer, the term of this patent is extended or adjusted under 35 U.S.C. 154(b) by 0 days.

(21) Appl. No.: 15/753,896

(22) PCT Filed: Aug. 17, 2016

(86) PCT No.: PCT/EP2016/069467
§ 371 (c)(1),
(2) Date: Feb. 20, 2018

(87) PCT Pub. No.: WO2017/032655
PCT Pub. Date: Mar. 2, 2017

(65) Prior Publication Data
US 2018/0252379 A1  Sep. 6, 2018

(30) Foreign Application Priority Data
Aug. 24, 2015 (EP) ................................. 15182132

(51) Int. Cl.
*F21V 11/00* (2015.01)
*F21S 41/16* (2018.01)
(Continued)

(52) U.S. Cl.
CPC ............. *F21S 41/16* (2018.01); *F21S 41/125* (2018.01); *F21S 41/24* (2018.01); *F21S 41/322* (2018.01); *G02B 6/0001* (2013.01); *F21S 45/47* (2018.01)

(58) Field of Classification Search
CPC .. F21S 41/16; F21S 41/24; F21S 41/14; F21S 41/322; F21S 41/125; G02B 6/0001
(Continued)

(56) References Cited

U.S. PATENT DOCUMENTS

2005/0270775 A1*  12/2005  Harbers ............. G02B 27/1046
                                                                 362/231
2012/0162962 A1   6/2012   Gladnick et al.
(Continued)

FOREIGN PATENT DOCUMENTS

CN         1275189 A      11/2000
CN         1471646 A       1/2004
(Continued)

OTHER PUBLICATIONS

EPO as ISA, "International Search Report and Written Opinion" dated Nov. 28, 2016 from International Application No. PCT/EP2016/069467, filed Aug. 17, 2016, 10 pages.
(Continued)

*Primary Examiner* — Matthew J. Peerce

(57) ABSTRACT

The present inventions relates to an illumination device, in particular for a vehicle headlight. The device comprises at least one light source, a wavelength converting member converting at least part of the light of the light source to light of a different wavelength, a first and a second light guiding element between the light source and the wavelength converting member, and a reflective member being attached to the wavelength converting member. The second light guiding element is designed to guide the light emitted by the light source and having passed through the first light guiding element to the wavelength converting member and to guide the converted light which has been reflected at the reflective member to the first light guiding element. The first light guiding element comprises at least one first guiding structure guiding the light emitted by the light source to the second
(Continued)

light guiding element. The first light guiding element also comprises at least one second guiding structure guiding the converted light which has been passed through the second guiding structure to an outcoupling surface of the first light guiding element. The proposed illumination device allows the use of light sources with high luminance and can be realized in a compact manner.

11 Claims, 2 Drawing Sheets

(51) Int. Cl.
  *F21V 8/00* (2006.01)
  *F21S 41/125* (2018.01)
  *F21S 41/24* (2018.01)
  *F21S 41/32* (2018.01)
  *F21S 45/47* (2018.01)

(58) Field of Classification Search
  USPC .......................................................... 362/510
  See application file for complete search history.

(56) References Cited

U.S. PATENT DOCUMENTS

| | | | |
|---|---|---|---|
| 2015/0015879 A1 | 1/2015 | Papadopoulos et al. | |
| 2015/0043233 A1* | 2/2015 | Bauer | B60Q 11/00 |
| | | | 362/510 |
| 2015/0049501 A1 | 2/2015 | Bauer et al. | |
| 2015/0167905 A1* | 6/2015 | Khrushchev | F21V 9/30 |
| | | | 362/84 |
| 2015/0377430 A1* | 12/2015 | Bhakta | G03B 21/204 |
| | | | 362/84 |
| 2018/0143368 A1* | 5/2018 | Hikmet | G02B 27/1006 |

FOREIGN PATENT DOCUMENTS

| | | |
|---|---|---|
| CN | 1844732 A | 10/2006 |
| CN | 1993075 A | 7/2007 |
| CN | 101135747 A | 3/2008 |
| CN | 201974383 U | 9/2011 |
| CN | 103402420 A | 11/2013 |
| CN | 103958963 A | 7/2014 |
| CN | 204178111 U | 2/2015 |
| DE | 102013207841 A1 | 10/2014 |
| JP | 2015008048 A | 1/2015 |
| WO | 214121310 A1 | 8/2014 |

OTHER PUBLICATIONS

Extended European Search Report dated May 5, 2016 from European Patent Application No. 15182132.9 filed Aug. 24, 2015, 5 pages.

CN Application 201680049012.0, "First Office Action," dated Sep. 16, 2019, 20 pages.

* cited by examiner

ILLUMINATION DEVICE FOR A VEHICLE HEADLIGHT

CROSS-REFERENCE TO RELATED APPLICATIONS

The present application is a § 371 application of International Application No. PCT/EP2016/069467 filed on Aug. 17, 2016 and titled "ILLUMINATION DEVICE FOR A VEHICLE HEADLIGHT," which claims the benefit of European Patent Application No. 15182132.9 filed on Aug. 24, 2015. International Application No. PCT/EP2016/069467 and European Patent Application No. 15182132.9 are incorporated herein.

FIELD OF THE INVENTION

The present invention relates to an illumination device, in particular for a vehicle headlight, in which light of one or several light sources is converted by a wavelength converting member to light of a different wavelength or wavelength range. Such illumination devices are for example used to convert blue light originating from one or several light emitting diodes or laser diodes to substantially white light for illumination purposes like the illumination of a road in front of a vehicle.

BACKGROUND OF THE INVENTION

The general principle of using blue laser light to illuminate a light converting member and generate light of a different wavelength spectrum is well known. JP 2015008048 A discloses an illumination device for a vehicle headlight comprising at least one laser light source, an optical fiber bundle and a wavelength conversion member. The laser light is guided through the fiber bundle and converted by the wavelength conversion member at the end face of the fiber bundle to create light of a different wavelength which will be projected by a subsequent optical system. This illumination device comprises an architecture where the light converting element is used in a transmissive configuration, meaning that the incident laser light and the converted light enter and leave from two opposite surfaces of the light converting member.

DE 102013207841 A1 discloses a vehicle illumination device comprising several laser diodes, a light guiding element consisting of several guiding structures and a wavelength converting member. The light guiding element is used to guide light from the laser sources to the wavelength converting member. One of the guiding structures in the light guiding element is used to guide a small part of the converted light emitted by the light converting member to a control unit for monitoring the light conversion. While most of the embodiments of this document use the wavelength converting member in a transmissive configuration, the document also discloses an embodiment in which a reflective element is attached to a side of the wavelength converting member opposite to the light guiding element. The reflective element with the light converting member is oriented such that the light from the laser diodes enters the light converting member at an angle to the surface normal such that the converted light is reflected by the reflecting element to pass the light guiding member on one side. This embodiment enables the light converting member with the reflective element to be attached to a heatsink for heat dissipation.

SUMMARY OF THE INVENTION

It is an object of the present invention to provide an illumination device, which is in particular suitable to be used for the headlight of a vehicle, comprises a compact design and may be used with for creating light with high luminance (>500 Mcd/m$^2$).

The object is achieved with the illumination device according to claim 1. Advantageous embodiments of the illumination device are subject matter of the dependent claims or are disclosed in the subsequent portions of the description.

The proposed illumination device at least comprises one or several light sources emitting light of a first wavelength or wavelength range, a wavelength converting member converting at least part of the light of the first wavelength or wavelength range into light of a second wavelength or wavelength range, a first and a second light guiding element between the one or several light sources and the wavelength converting member, and a reflective member being attached to a side of the wavelength converting member. The first light guiding element is arranged between the one or several light sources and the second light guiding element. The second light guiding element is arranged between the first light guiding element and the wavelength converting member. The reflective member is attached to the side of the wavelength converting member opposite to the second light guiding element to reflect the light of the second wavelength or wavelength range back through the wavelength converting member to the second light guiding element. The second light guiding element is designed to guide the light emitted by the one or several light sources and having passed through the first light guiding element to the wavelength converting member and to guide the light of the second wavelength or wavelength range which has been reflected at the reflective member to the first light guiding element. The first light guiding element comprises at least one first guiding structure, in the following also called first light guiding subunit, guiding the light emitted by the one or several light sources to the second light guiding element. The first light guiding element also comprises at least one second guiding structure, in the following also called second light guiding subunit, guiding the light of the second wavelength or wavelength range which has been reflected at the reflective member and passed through the second light guiding element to an outcoupling surface of the first light guiding element. The light of the second wavelength or wavelength range leaving the first light guiding element through said outcoupling surface may then be used for the desired illumination purposes.

The proposed illumination device allows to attach the light converting member with the reflective member on the side of the reflective member to a suitable heat removing element, i.e. an appropriate heatsink. This enables to use the illumination device with light sources of high power to generate high luminances. Since the converted light is back reflected into the second and first light guiding members and guided in these members, the whole device can be realized with compact dimensions. Due to the typically high radiance of laser diodes, in particular in case of laser diodes emitting in the blue wavelength range, only very little of the cross sectional area of the first light guiding element is needed for the guidance of the light of the one or several first light sources, i.e. the corresponding first light guiding structures or subunits occupy only a very small cross section of the first light guiding element. The light of the second wavelength or wavelength range thus can be guided in the remaining cross section of the first light guiding element, for example by incorporating a second light guiding structure of a substantially higher cross sectional area or a higher number of second light guiding structures or sub units. If the device comprises several light sources, the light of these light sources may be guided in a common first light guiding structure, but may also be guided in several first light guiding structures, each for one or several of these light sources.

In a preferred embodiment several second light guiding structures are formed in the first light guiding element, at least one of said second light guiding structures or sub units being used to guide a portion of the light of the second wavelength or wavelength range to a control unit detecting the intensity of this light. This control unit thus comprises a detector system to monitor the generation of the light of the second wavelength or wavelength range to be able to detect any failure of light generation or light conversion. Furthermore, monitoring the color and intensity of the light of the second wavelength or wavelength range allows a compensation of effects of aging.

The first light guiding element may be formed of an optical fiber bundle, the fibers forming the first and second guiding structures or sub units of the first light guiding element. Nevertheless the first light guiding element may also be formed in another way, for example by an optically transparent bulk material in which waveguides for guiding the light of the first and second wavelength or wavelength region are integrated.

The second light guiding element may be formed as a compound parabolic concentrator, a cone shaped rod, a TIR-optic (TIR: total internal reflection) or a similar optical system having a larger cross sectional end surface on the side of the first light guiding element and a smaller cross sectional end surface on the side of the light converting member. This second light guiding element in this embodiment thus concentrates the light of the one or several light sources to the surface of the light converting element and also concentrates the light of the second wavelength or wavelength range to the end face of the first light guiding member, since this converted light typically leaves the light converting member in a large range of directions.

The first and the second light guiding elements are preferably attached to one another in order to avoid light losses occurring when light enters one of these elements from an air gap in between. For the same reason the second light guiding element is preferably in contact with the surface of the light converting member. Alternatively a gap may exist between the first and second light guiding element and/or between the second light guiding element and the converting element. Some types of second light guiding elements need an air gap to the converting element to work properly. In order to avoid light losses at such gaps the corresponding surfaces may be AR-coated (AR: antireflective).

The reflecting member may be formed of a substrate having an optically reflective surface to which the light converting member is attached. The reflective member may also be formed of a reflective surface layer on the light converting member.

The one or several light sources are preferably light emitting diodes or laser diodes. The light emitted by these light sources is preferably light in the blue wavelength region, in particular light around the wavelength of 450 nm.

The light converting member preferably comprises a phosphor to convert the light of the first wavelength or wavelength range to the light of the second wavelength or wavelength range. The light may also be only partly converted and the non-converted light is then preferably scattered and reflected and guided in the same manner as the light of the second wavelength or wavelength region. Depending on the illumination purpose, the mixture of both wavelengths or wavelength ranges may be used for the illumination purpose or the non-converted light of the first wavelength or wavelength region is filtered out on the way to the application. For example, the phosphor converting blue light to substantially white light may be a YAG:Ce phosphor. The phosphor may form the whole light converting member or may only be part of this light converting member, for example a surface layer of a substrate, the substrate with the surface layer then forming the light converting member.

The proposed illumination device may be used as a high luminance light source for automotive lighting, e.g. for the headlamp of a vehicle. The application of this illumination device is however not restricted to this application. The illumination device may for example also be used as a remote light source for conventional lighting or for video projection or data projection.

BRIEF DESCRIPTION OF THE DRAWINGS

The present invention is described in the following by way of examples in connection with the accompanying figures. The figures show.

DESCRIPTION OF EMBODIMENTS

Figure 1:
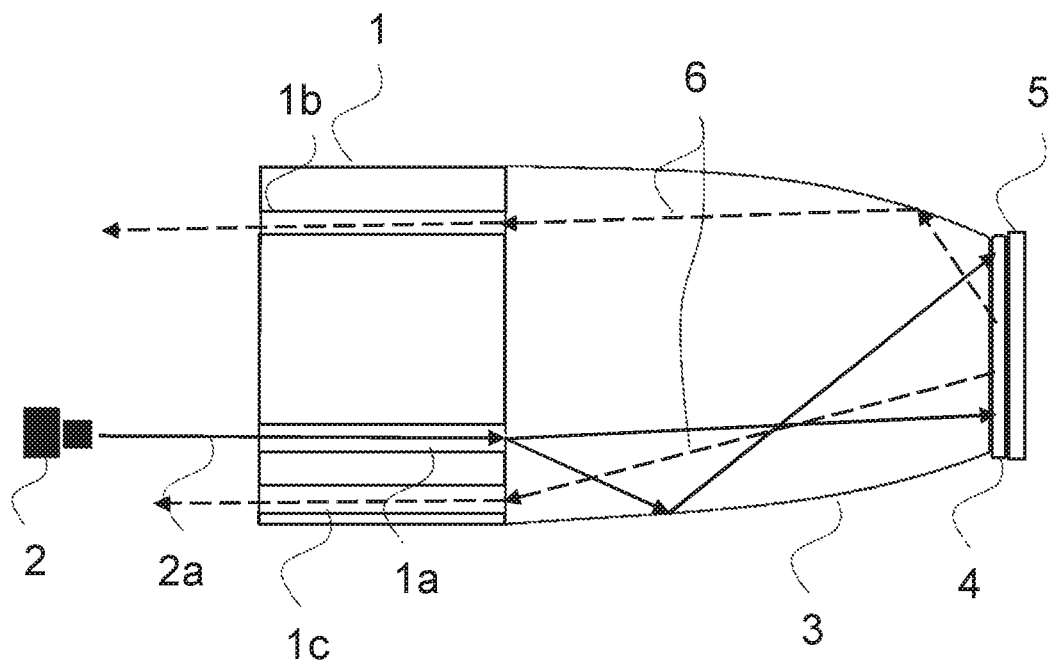
FIG. 1 a schematic cross sectional view of an example of the proposed illumination device.

In the following an example of the proposed illumination device is described with reference to FIG. 1. The proposed illumination device in this example comprises a blue laser source 2 emitting blue laser light 2a which is to be converted to yellow light 6 by a light converting member 4. The blue laser light 2a emitted by the blue laser source 2 is coupled to a first light guiding structure 1a of a first light guiding element 1 and guided by this light guiding structure 1a to a second light guiding element 3. Because of the high radiance of the blue laser source 2 only very little of the cross sectional area of the first light guiding element 1 is needed for the guiding of the blue laser light 2a. This is also indicated in the cross sectional view of FIG. 1. At the exit surface of the first light guiding element 1 the blue laser light 2a is guided through a second light guiding element 3 to the light converting member 4. This light converting member 4 is formed of an appropriate phosphor for converting the blue laser light 2a to yellow light 6. The light converting member 4 is attached to a reflective member 5 which reflects, after passing the light converting member 4, the converted light 6 in opposite direction through the light converting member 4 into the second light guiding element 3. The second light guiding element 3 guides the reflected light to the first light guiding element 1. Portions of the converted light 6 are then guided via exemplary second guiding structures 1b, 1c of the first light guiding element 1 to an outcoupling surface of the first light guiding element 1 as shown in the figure. The converted light 6 leaves the first light guiding element 1 through this outcoupling surface to be used for the illumination application.

Additional second light guiding structures may be incorporated in the first light guiding element 1 to guide portions of the converted light 6 to a detector system for analyzing and monitoring purposes. Furthermore, the second light guiding structures may occupy a larger cross sectional area or may be formed of a higher number of such structures to guide a higher portion of the converted light to the outcoupling surface of the first light guiding element 1. At the back side of the reflecting member 5 a heatsink may be attached to remove the heat generated by the high power laser light in the light converting member 4.

Figure 2:
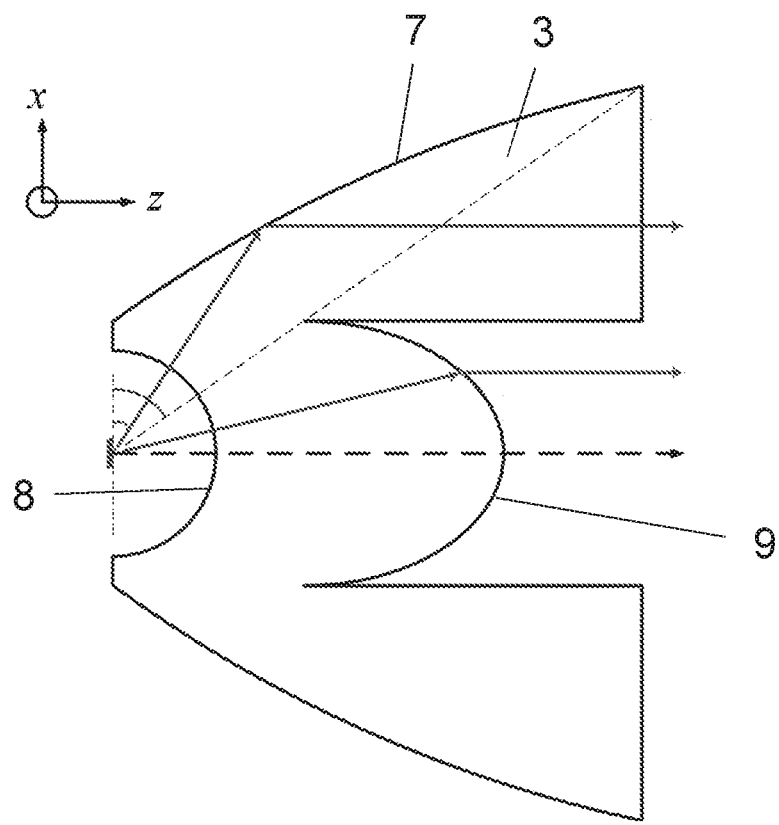
FIG. 2 an example of an optical concentrator which can be used as the second light guiding element of the proposed illumination device.

In the example of FIG. 1, the second light guiding element 3 has a larger cross section at the side of the first light guiding element 1 and a smaller cross section at the side of the light converting member 4 to act as a light concentrator. FIG. 2 shows another example of such a light concentrator which may be used as the second light guiding element 3. This optical concentrator as known from the prior art comprises a TIR surface 7, a spherical surface 8 and a refractive surface 9 in order to guide the light passing this concentrator. The light converting member 4 is then arranged on the side of the spherical surface 8, the first light guiding element 1 on the opposing side. In order to avoid losses at the air gaps formed when using such an optical concentrator, the corresponding surfaces may be coated with appropriate antireflective layers.

Figure 3:
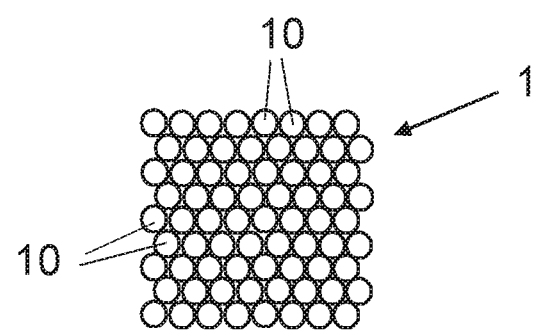
FIG. 3 a schematic front view of a fused fiber bundle which may be used as the first light guiding element of the illumination device.

The first light guiding element 1 is preferably formed of a fused fiber bundle. FIG. 3 shows a schematic view on one side of such a fiber bundle, in this example the outcoupling surface. As can be seen from this figure, the fiber bundle with the individual fibers 10 can be formed to show a special cross sectional shape, in this example a quadratic shape. The shape of this fiber bundle may be different on the side of the second light guiding element 3.

While the invention has been illustrated as described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure and the appended claims. In the claims the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the invention.

LIST OF REFERENCE SIGNS

1 first light guiding element
1*a* first light guiding structure
1*b* second light guiding structure
1*c* second light guiding structure
2 blue laser source
2*a* blue laser light
3 second light guiding element
4 light converting member
5 reflective member
6 converted yellow light
7 TIR surface
8 spherical surface
9 refractive surface
10 fibers of fiber bundle

The invention claimed is:

1. An illumination device, in particular for a vehicle headlight, at least comprising
   one or several light sources emitting light of a first wavelength or wavelength range,
   a wavelength converting member converting at least part of the light of the first wavelength or wavelength range into light of a second wavelength or wavelength range,
   a first and a second light guiding element, said first light guiding element being arranged between the one or several light sources and the second light guiding element and said second light guiding element being arranged between the first light guiding element and the wavelength converting member, and
   a reflective member being attached to a side of the wavelength converting member opposite to the second light guiding element to reflect the light of the second wavelength or wavelength range back through the wavelength converting member to the second light guiding element,
   wherein the second light guiding element is designed to guide the light emitted by the one or several light sources and having passed through the first light guiding element to the wavelength converting member and to guide the light of the second wavelength or wavelength range which has been reflected at the reflective member to the first light guiding element,
   wherein the first light guiding element comprises at least one first guiding structure guiding the light emitted by said one or several light sources to the second light guiding element and at least one second guiding structure guiding the light of the second wavelength or wavelength range which has been reflected at the reflective member and passed through the second light guiding element to an outcoupling surface of the first light guiding element, and
   wherein said at least one first guiding structure guides the light emitted by said one or several light sources through a first part of a cross sectional area of the first light guiding element, and said at least one second guiding structure guides at least a portion of the light of the second wavelength or wavelength range through a second part of the cross sectional area of the first light guiding element, the second part of the cross sectional area excluding and being larger than the first part of the cross sectional area.

2. The device according to claim 1, wherein said one or several light sources are light emitting diodes or laser diodes.

3. The device according to claim 2, wherein said one or several light sources are light emitting diodes or laser diodes emitting light in the blue wavelength range as said light of said first wavelength or wavelength range.

4. The device according to claim 1, wherein said first light guiding element is formed by an optical fiber bundle.

5. The device according to claim 4, wherein said optical fiber bundle is fused on at least one end.

6. The device according to claim 1, wherein said second light guiding element is formed by an optical element acting as an optical concentrator towards the light converting member.

7. The device according to claim 6, wherein said second light guiding element is formed by a compound parabolic concentrator, a cone shaped rod or a TIR-optic.

8. The device according to claim 1, wherein said reflective member is formed as a reflective layer on said wavelength converting member.

9. The device according to claim 1, wherein said first and second light guiding elements are attached to one another.

10. The device according to claim 1, wherein the first light guiding element comprises several second guiding structures, at least one of said second guiding structures guiding part of the light of the second wavelength or wavelength range to an optical detector.

11. The device according to claim 1, wherein the at least one first guiding structure guides the light emitted by said one or several light sources from a first surface of the first light guiding element to a second surface of the first light guiding element, and the at least one second guiding structure guides the light of the second wavelength or wavelength range from the second surface of the first light guiding element to the first surface of the first light guiding element.

* * * * *